United States Patent [19]

Duranton et al.

[11] Patent Number: 4,994,982
[45] Date of Patent: Feb. 19, 1991

[54] NEURAL NETWORK SYSTEM AND CIRCUIT FOR USE THEREIN

[75] Inventors: Marc Duranton, Boissy-Saint-Leger; Jean Gobert, Maisons Alfort; Jacques-Ariel Sirat, Limeil-Brevannes, all of France

[73] Assignee: U.S. Philips Corporation, New York, N.Y.

[21] Appl. No.: 289,648

[22] Filed: Dec. 22, 1988

[30] Foreign Application Priority Data

Dec. 23, 1987 [FR] France .................. 87 18044

[51] Int. Cl.$^5$ .............................................. G06F 15/18
[52] U.S. Cl. .................................... 364/513; 307/201
[58] Field of Search ............... 364/300, 513, 200, 900; 307/201

[56] References Cited

U.S. PATENT DOCUMENTS 4,193,115 3/1980 Albus .................................. 364/300
4,773,024 9/1988 Faggin et al. ..................... 364/513

OTHER PUBLICATIONS

S. C. J. Garth, "A Chipset for High Speed Simulation of Neural Network Systems", IEEE Conf. Neural Networks, San Diego III-433-452 (1987).
S. White "Architecture for a Digital Programmable Image Processing Element", ICASSP '81, 3/30-4/1/81, vol. 1, pp. 658-661.

Primary Examiner—Allen R. MacDonald
Attorney, Agent, or Firm—Anne E. Barschall

[57] ABSTRACT

A neural network system comprises a memory for storing in binary code the synaptic coefficients indicative of the interconnections among the neurons. Means are provided for simultaneously supplying all the synaptic coefficients associated with a given neuron. Digital multipliers are provided for determining the product of the supplied synaptic coefficients and the relevant neuron states of the neurons connected to said given neuron. The multipliers deliver their results into an adder tree for determining the sum of the products. As a result of the parallel architecture of the system high operating speeds are attainable. The modular architecture enables extension of the system.

29 Claims, 8 Drawing Sheets

NEURAL NETWORK SYSTEM AND CIRCUIT FOR USE THEREIN

The invention relates to a neuronal circuit for a neural network system, which circuit enables digital determination of new states of M neurons by determining products of states of N input neurons and M input vectors of N synaptic coefficients which are associated with each interconnection between neurons and which are stored in a programmable memory.

The invention also relates to a system utilising one or more of such circuits.

Neural networks enable the solution of problems which are very difficult to handle by means of conventional methods such as used in computers. The problems to be dealt with by neural networks are problems relating to classification, recognition of shapes or characters, speech signal processing, image processing, combinatory optimization, etc.

The conventional methods often use complex algorithms, while the neural networks treat these problems by way of learning and iterations.

In order to solve such problems as well as possible, it is useful to conceive a system which implements the neural networks with an efficiency as high as possible.

A neural network is a network comprising interconnected elementary processors. During each iteration, the processors form the weighted sum of the state of the neurons connected thereto. Via a function which in general is non-linear (sigmoid, threshold, etc.), this sum is transformed in order to produce the state of the neuron considered. The value used for weighting the state of the connected neurons is referred to as a synaptic coefficient. This is a coefficient enabling (re)configuration of the network in order to perform different functions.

An invention of this kind is disclosed in the document "A chipset for high speed simulation of neural network systems", S. Garth, IEEE Conference Neural Networks SAN DIEGO (USA) III-443 (1987). This document describes a neural network system organised on the basis of subnetworks which themselves are formed on the basis of an integrated circuit which performs a given number of specific calculation and control tasks. Such an integrated circuit comprises a multiplier/summing device which performs the repetitive multiplication/summing operations. This multiplier/summing device operates sequentially on the data. The integrated circuit also comprises control elements, notably for the addresses and for the synaptic coefficient memory which is external of the integrated circuit. Such a circuit can operate only slowly and constantly necessitates the addressing of memories. Moreover, its construction is rigid and cannot be adapted to different situations wherein the neuron states are encoded on a number of bits which may change, during use. Therefore, the circuit cannot be reconfigured.

The principal problem involved consists in that the circuit must be very fast and readily adaptable to a reconfiguration of the encoding of the neuron states, either choosing a set of programmable functions or chosing a function that is modifiable in accordance with the application.

The solution to this problem is offered by an integrated circuit for performing for a given neuron chosen from the M neurons, parallel processing of all synaptic coefficients of the given neuron and which comprises:

the programmable digital memory which is integrated in the circuit, for storing the N×M synaptic coefficients of all M neurons encoded on p bits, and for simultaneously supplying all synaptic coefficients of the given neuron, N digital multipliers for determining the products of the N synaptic coefficients of the given neuron and the states of the N input neurons, an adder tree for determining the sum S of all said products for the given neuron, a digital state memory for receiving the N input neurons which may be encoded from 1 to n bits in a reconfigurable mode, the circuit being controlled by control means.

As a result of the parallel architecture of the circuit and its integrated memory which simultaneously supplies all synaptic coefficients of a given neuron, the calculation of all products relating to this given neuron can thus be simultaneously performed, resulting in a high-speed circuit.

Preferably, the multipliers are formed by logic AND-gates.

A neural network is a network consisting of interconnected elementary processors. A specific arrangement consists in the connection of a neuron to all neurons: a fully connected network is then obtained. This type of network is realised in accordance with the invention when the number of N input neurons equals the number of M output neurons.

The neurons may also be arranged in successive layers, the connections existing exclusively between the successive layers: in that case a layer-type network is obtained. This type of network is realised in accordance with the invention when for a first layer C the N input neurons are connected to M output neurons, the latter constituting the N input neurons of a second layer C+1 which supplies M output neurons.

The circuit determines the sum S of the contributions made to a given neuron by the state of the neurons connected thereto, weighted by each synaptic coefficient. Preferably, the circuit utilises signed synaptic coefficients, the adder tree comprising adders which operate on the sign bits of the N products. This increases the range of application of the circuit.

When the state of a neuron is encoded on 1 bit, the state memory comprises N storage elements, the determination of the sum S is then performed during a single control cycle after the reading of the synaptic coefficients.

When the state of each neuron is encoded on n bits, the state memory comprises N×n storage elements, each neuron state (or each relevant synaptic coefficient) being read by means of an associated selector from a group A of selectors which successively selects the n bits of the neuron state (or said relevant synaptic coefficient) in order to supply a signal EM which is applied to a multiplier comprising logic AND-gates, the group A of selectors being controlled by the control means via a signal SELA, the adder tree comprising, connected to its output, an adder and a shift accumulator so that the sum S is determined in n (or p) shift control cycles after the reading of the synaptic coefficients in the programmable memory.

However, the neuron states may be encoded as well in logic levels K=+1/−1, the synaptic coefficients being read in the programmable memory such as they are stored therein for K=+1 or in inverted logic levels for K=−1, using N switches which are controlled by a selection signal SEL. When the neuron states are encoded according to the logic values $+1/-1$ (or in 2's-complement according to $n-1$ bits plus the sign), the learning phase may necessitate fewer operations than in the case of neuron states encoded according to logic values 0/1 (or in positive integers on n bits).

The neuron states may be encoded in 2's-complement, the adder tree comprising, connected to its output, an adder/subtractor and a shift register, the "subtract" operation being performed at the instant at which the sign bit of the neuron state is selected and if this sign bit represents a negative value. The circuit can also operate for any neuron state encoded in 2's-complement, without utilising an external subtractor.

At an instant t the neuron state i is represented by $d_i(t)x$ at an instant $t+1$, the state of the same neuron i is represented by $d_i(t+1)$, so that:

$$d_i(t+1) = F \text{ (sum of } C_{ij} \times d_j(t))$$

where $C_{ij}$ is the synaptic coefficient matrix where i relates to [1,M] for the output and j relates to [1,N] for the input. The sum of all products is thus subjected to a function F. This is generally a nonlinear function (threshold, sigmoid, etc.), but may also be any other type of function. The converter element for applying said function F may be an internal element. It is, for example, a digital memory which can be incorporated in the neuron circuit either in the form of a read-only memory ROM, in which case the function is fixed, or in the form of a random access memory RAM, in which case the function can be modified. The converter element may also be an external element, for example, a digital ROM or RAM as before or a microprocessor or other processor. The result obtained enables a new state to be substituted for the previous state of the neuron i. The operations are thus performed for each state of the neurons until a new configuration of the neuron states is obtained which represents the final result. This is referred to as the resolution mode of the circuit. The coefficients $C_{ij}$ remain unchanged for a given application. In this case the synaptic coefficients may be definitely fixed when a read-only memory ROM is used. They can be loaded at the beginning of a given application when a random access memory RAM is used.

However, other applications exist for which the coefficients $C_{ij}$ do not remain unchanged during the application. This is the case in applications where a learning phase occurs. Initially the circuit is not adapted to the intended application. It must learn to recognise the parameters of the specific application. For example, one may supply to the input a configuration of data which is specific of the application and on the basis of which the circuit will obtain, by learning, the appropriate synaptic coefficients. The processor, such as a microprocessor, controls the operation of the circuit during this phase.

For a given application one may also systematically supply real data to the input of the circuit, which data have a common functional property. This enables the processor to control the circuit so that the values of the coefficients dynamically converge towards the synaptic coefficients specific of the application. To this end, the programmable digital memory is a random access memory RAM which receives the synaptic coefficients updated as a function of the state of the M neurons so that the circuit operates in the learning mode.

The operation of such a circuit does not require an external clock, which means that it will behave in the same way as, for example a conventional memory.

The circuit can also comprise a double digital state memory. In that case each new state of a neuron is stored in the second memory until all new neuron states have been determined on the basis of all previous states. The kind of updating of the network thus realised is called synchronous updating. The states are then updated at the end of a global evaluation phase for all neuron states and no longer one state after the other as is the case when there is only a single digital state memory present (the latter kind of updating being called asynchronous). The choice of the synchronous or asynchronous mode enables optimisation of the dynamics of the network. This also enables the updating of each neuron at a rate which may differ for each neuron; this is useful for the processing of the input data which may vary in time, for example during the detection of movement.

In the synchronous mode, the circuit comprises two state memories, one of which stores the states of the input neurons whilst the other memory stores the new neuron states, the latter states being the relevant states when the renewal of all the input neuron states has been effected.

When the circuit is associated with an external digital code converter element, it constitutes a neuronal device. A plurality of said circuits may be cascaded in order to extend the processing possibilities when the converter element is an external element. Two of these circuits can thus be used, for example, for doubling either the number of neurons or the number of synapses. The outputs of the two circuits are added, possibly externally, and the result is introduced into the external converter element.

More generally, the circuits or the devices can be grouped in order to form a system of neural networks comprising k neuron circuits or devices which are capable of storing $k \times N \times M$ synaptic coefficients, organised in such a way as to perform the processing of M neurons of $k \times N$ synaptic coefficients or $k \times M$ neurons of N synaptic coefficients or other, more complex combinations. Thus, an arrangement of $k = k_1 \times k_2$ neuron circuits or devices for $k_1 \times M$ neurons with $k_2 \times N$ synaptic coefficients can be obtained.

Alternatively, the arrangement may comprise n circuits or devices, each of which comprises a digital state memory which stores 1 bit of each state, the states being encoded on n bits, the circuits being connected in parallel in order to increase the processing speed. The real-time processing speed can thus be increased.

So far the description has only dealt with neural networks of the order 2 with synaptic coefficients $C_{ij}$ (two indices i and j). The invention also extends to neural networks of a higher order, for example networks of the order $q = 3$ with synaptic coefficients $C_{ij}$ (three indices i, j and k). Thus, it concerns groups of neural networks which comprise circuits, devices or arrangements having an order of at least 2.

The invention will be described in detail hereinafter, by way of a non limitative example, with reference to the following Figures; therein

Figure 1:
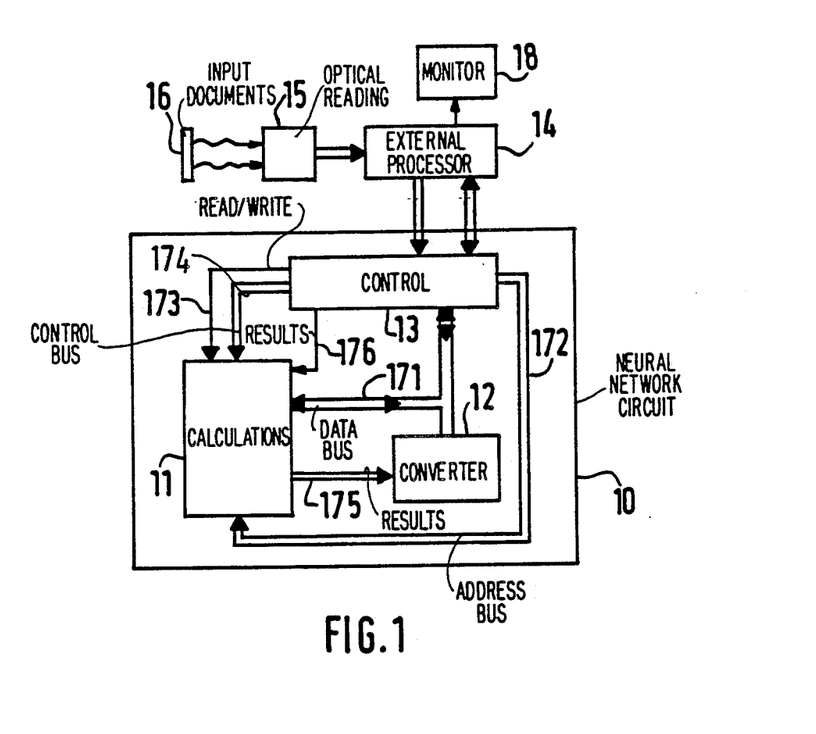
FIG. 1 shows a diagram of an assembly of a circuit and a neural network system for an application concerning character recognition.

FIG. 1 shows a diagram of a neural network circuit 10 which comprises a block 11 which performs the actual calculations, a converter element 12 and a control circuit 13 which supplies the control signals and routes the data. The control circuit 13 is connected to the external processor 14 which is, for example, a microprocessor. In the example shown, the microprocessor 14 receives data from an optical reading device 15 which reads the N pixels of characters on an input document 16.

In a first embodiment, the neural network circuit operates on the basis of synaptic coefficients determined in advance.

During a first phase these coefficients may be loaded either into a read-only memory ROM during the manufacture of the memory or into a random access memory RAM during the programming of the structure for a given application; the latter may very well be modified at a later stage. In this second case the synaptic coefficients are loaded into the memory from the microprocessor 14, via the data bus 171. The addresses i and j of the memory are supplied by the address bus 172. The exchanges are controlled by a read/write signal 173 and by a control bus 174.

During a second phase the circuit 10 performs the intended operation on the basis of loaded synaptic coefficients (resolution phase). The microprocessor 14 applies the data from the optical reader 15 to the circuit 13. These data constitute the neuron states and are also transported via the data bus 171. The block 11 of the circuit performs the intended operation (detailed hereinafter) and applies its results, via the bus 175, to the converter element 12 which performs the non-linear function for which it is programmed.

The converter element then supplies a new state for each neuron which state is introduced into the block 11, via the bus 171, in order to update the neuron state stored therein. The selection signal 176 and the address bus 172 determine the neuron to be updated. When all neurons have thus been redetermined, the new neuron states are transported to the microprocessor 14, via the bus 171 and the circuit 13. The processing result can then be displayed on a monitor 18.

In a second embodiment, the circuit can operate in the learning mode. The programmable digital memory is then formed by a random access memory RAM. The microprocessor 14 no longer itself supplies the synaptic coefficients but calculates the coefficients during the application itself. Thus, the neuron circuit must learn to recognise the application. For example, when a complex signal S1 is formed from a sum of two signals S2 and S3 weighted by coefficients -a-and -b- so that $S1 = a \times S2 + b \times S3$, the circuit 13 can execute a program which utilises these properties of this weighted sum so that the neural network system (neuron circuit plus processor) can learn to determine the constituent signals S2 and S3.

Thus, there is first of all a learning phase during which the data supplied by the optical reader 15 are applied to the block 11 via the bus 171. After application of the non-linear function by the converter element 12, the result is re-introduced into the block 11, via the bus 171. The result is also processed by the microprocessor 14 in order to modify the synaptic coefficients stored in the block 11. This phase is controlled by the control circuit 13 which supplies the necessary control signals.

When this learning phase is terminated, the previously described resolution phase takes place during which the neuron states are calculated on the basis of the adapted coefficients.

Figure 2:
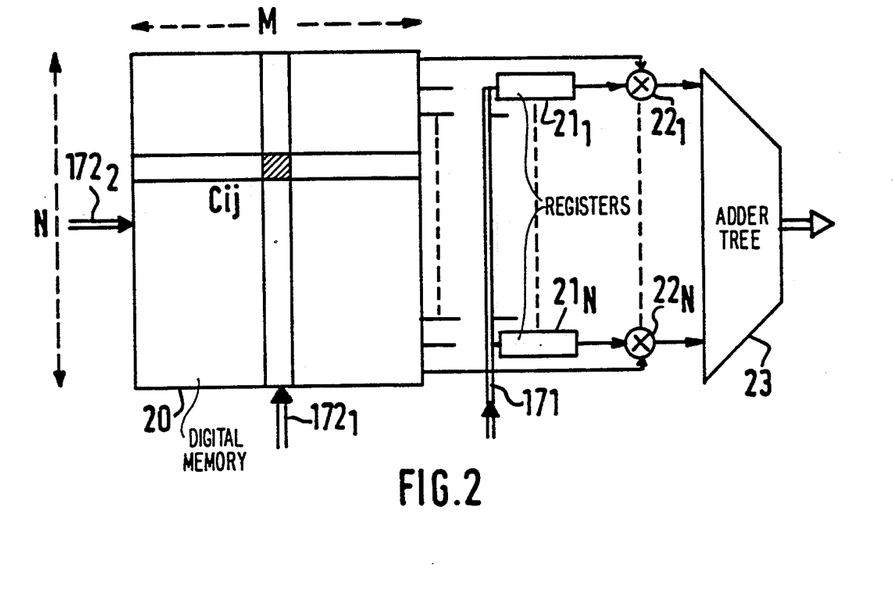
FIG. 2 shows a more detailed diagram of a part of the circuit.

FIG. 2 shows a diagram of a part of the elements of the block 11. This diagram comprises a programmable digital memory 20 with a row address bus $172_2$ and a column address bus $172_1$. The memory 20 stores the synaptic coefficients $C_{ij}$. The maximum number of rows is N and the maximum number of columns is M, representing a network of M neurons connected to N neurons. The neuron states are stored in N registers $21_1$ to $21_N$ of the neuron state memory. Multipliers $22_1$ to $22_N$ multiply the synaptic coefficients of a given column by the neuron states stored in the N registers $21_1$ to $21_N$. The products thus obtained are added two by two in an adder tree 23. According to this diagram, the data bus 171 is connected exclusively to the digital state memory formed by the group of state registers $21_1$ to $21_N$. However, when the programmable digital memory 20 is a random access memory, it is also connected to the bus 171 for programming the synaptic coefficients. There may be provided a separate bus for fast access to the synaptic coefficients for given applications, for example for the learning by means of an external processor.

Figure 3:
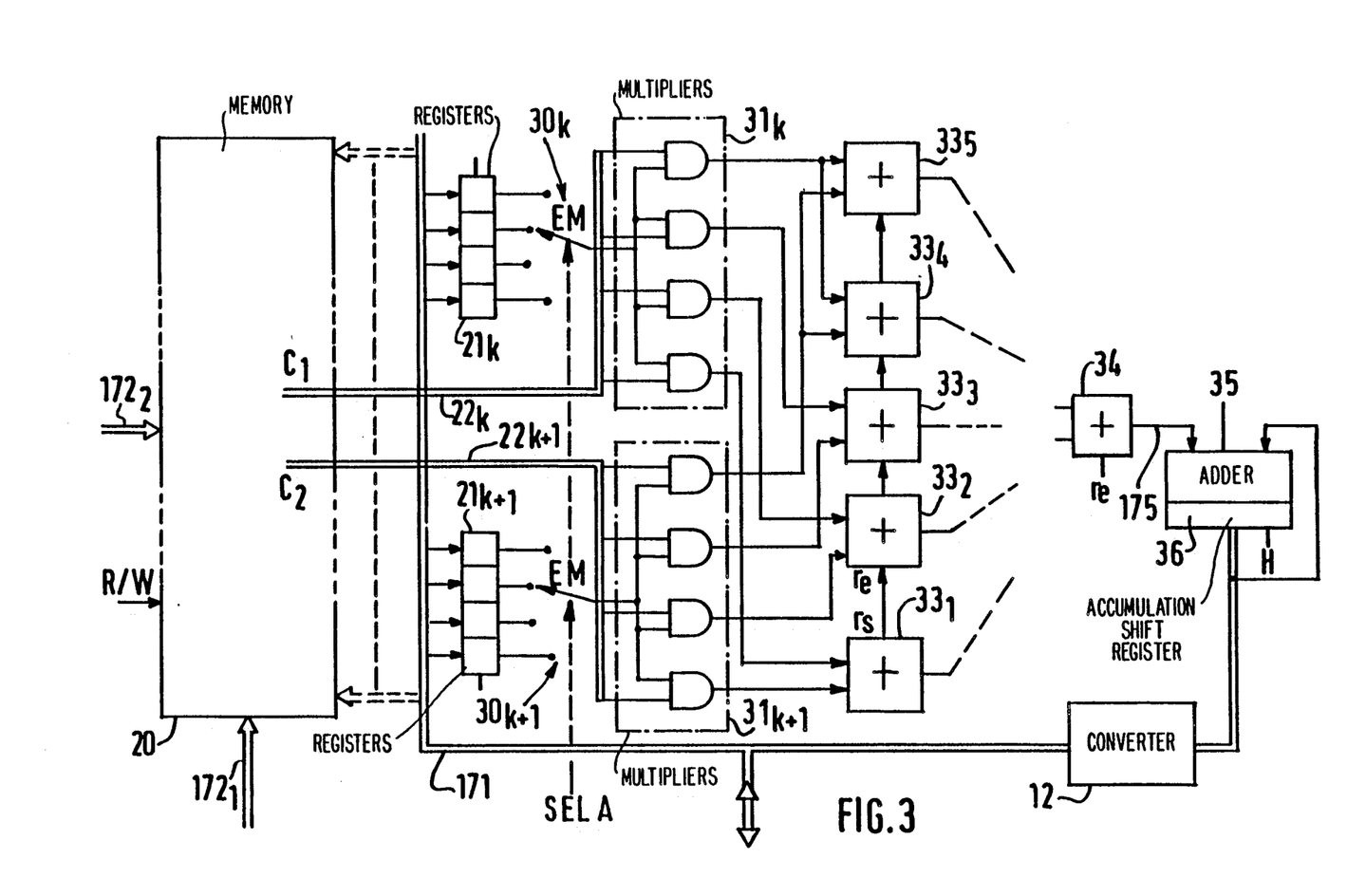
FIG. 3 shows a diagram of a specific embodiment of the multipliers and the selectors of the states of the neurons stored in the state memory for the case where p=4 bits and n=4 bits.

FIG. 3 shows a diagram of a particular version of the multipliers and the selection of the neuron states. According to this diagram, given by way of example, a neuron state is encoded on n=4 bits. The digital state memory thus comprises N memory registers of n=4 bits, such as the registers $21_k$, $21_{k+1}$ connected to the bus 171. The multipliers $31_k$, $31_{k+1}$ are formed by logic AND-gates. Each multiplier $31_k$, $31_{k+1}$ is connected to a row of the programmable memory 20 via a bus $22_k$, $22_{k+1}$ which comprises as many connections as there are bits that encode each synaptic coefficient. In FIG. 3 two consecutive synaptic coefficients C1 and C2 are shown to be encoded on p=4 bits. In this case a multiplier $31_k$ comprises four logic AND-gates, each of which receives one of the bits of the synaptic coefficient C1. Similarly, the multiplier $31_{k+1}$ receives the synaptic coefficient C2. The other input of each logic AND-gate receives a data EM supplied by a selector $30_k$, $30_{k+1}$ which successively fetches, starting with the least significant bit, each of the neuron state bits of the memory register $21_k$, $21_{k+1}$. The selectors $30_k$, $30_{k+1}$ are controlled by a common selection signal SELA which is supplied by the control circuit 13 (FIG. 1). The outputs of the AND-gates are added to one another by an adder tree according to their binary weight. The adders $33_1$ and 33₄ thus add the least significant bits and the most significant bits, respectively. An adder 33₅ operates, in the same way as the adder 33₄, on the same data supplied by the multipliers 31$_k$ and 31$_{k+1}$. The carry of the adder 33₄ is introduced into the adder 33₅. The calculation performed herein takes place on the basis of signed data. In the chain of adders 31₁ to 33₅ the carry supplied by an adder is introduced into the next adder. The input carry $r_e$ originates from a preceding adder and the output carry $r_s$ enters a next adder. It may be necessary in some cases to introduce into the first adder 33₁ a carry $r_e$ suitably encoded. In other cases, for each neuron state word and for each stage of the tree the input carry of the adder associated with the least significant bit of the word is set to zero.

The outputs of the adders themselves are added two-by-two along the overall adder tree. The last adder 34 of the tree outputs a result on the connection 175.

In the example illustrated in FIG. 3, the state of a neuron is encoded on n bits. In that case a result is obtained on the output 175 relating to each binary weight of the states of all neurons. The n consecutive results are introduced into an adder 35 which comprises an accumulation shift register 36. This accumulation shift register 36 is formed, for example by an accumulator and a shift register. The result on the output of the register 36 is thus re-introduced into the adder 35, is shifted and is added to the data on the output 175. The final result is thus obtained after n clock periods, the clock signals being supplied by the control circuit 13 (FIG. 1) onto terminal H. This final result is applied to the converter element 12 which supplies data every n clock periods, which data define a new neuron state which is re-introduced into the corresponding state register. The calculation continues with the next neuron state until all neurons have been examined.

The state of the neurons being encoded on n bits, the state memory comprises N×m storage elements and the result for a neuron is obtained after n control cycles. The order in which the selection, by means of the selectors of the bits of a neuron state word, is performed is directly linked to the type of code of the word. Thus, it may differ from that considered in the cited examples. It is also possible for an n-bit neuron state register to code, for example 2 neurons of n/2 bits. The data processing speed is thus increased. More generally, it is also possible for an n-bit neuron state register to code q slices of n/q bits. Thus, there are Nxq input neurons with q columns in the matrix of synaptic coefficients for a given output neuron. Thus, M/q output neurons are obtained. This enables a much larger number of input neurons, resulting in a supplementary flexibility of the configuration by fully utilising the entire synapses table of the circuit.

However, the neuron state may be encoded on 1 bit. In that case the state memory comprises only N 1-bit registers, each register activating a multiplier. The result is then obtained after a single control cycle. The adder 35 may then be omitted for a neural network system operating with states encoded on 1 bit.

Figure 4:
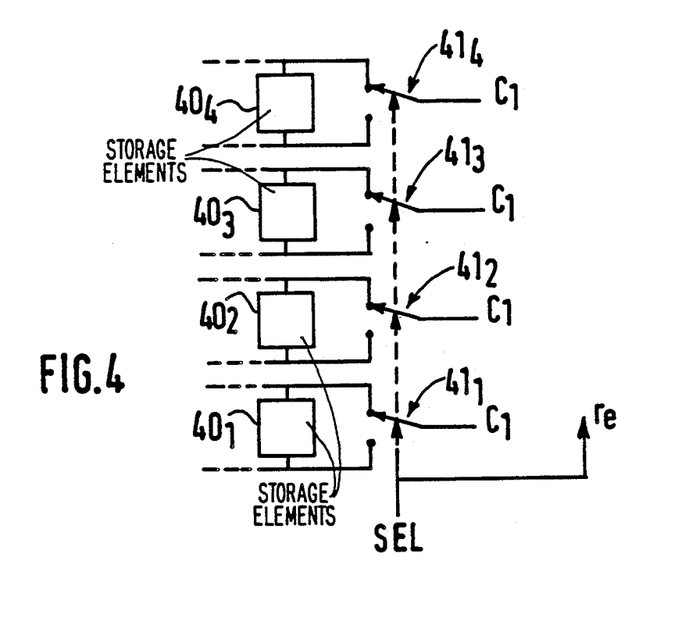
FIG. 4 shows a diagram of the read mode for the synaptic coefficients of the level +1, −1.

The synaptic coefficients C1 and C2, encoded on p bits, are multiplied by the values 0 or 1, but may also be multiplied by the values −1 or +1. FIG. 4 shows a diagram enabling the generating of such products. The programmable digital memory storing the synaptic coefficients $C_{ij}$ is formed by storage elements such as the elements 40₁, 40₂, 40₃, 40₄. Each storage element can generate either the logic value stored or the inverse logic value. For multiplying the synaptic coefficients by the neuron states with the logic values +1/−1 use is made of switches 41₁ to 41₄ which fetch the coefficients according to one or the other of the possible configurations under the control of a selection signal SEL. This signal acts simultaneously on all switches which control each bit of the same neuron. Thus, FIG. 4 shows a neuron state encoded on 4 bits. The data such as C1 is introduced into the multipliers in accordance with the diagram shown in FIG. 3.

Each time when the signals SEL select the inverse coefficients, they are also applied to the carry inputs of the adders of the tree which are associated, with the least significant bit in a state word (input $r_e$ of the first adder 33₁ for example). This operation serves to add the value +1 to a data in order to perform a signed addition in 2's-complement.

By simultaneously controlling the selection signals SELA (FIG. 3) and SEL (FIG. 4), differently encoded neuron states can be used. This is shown in the FIGS. 5A, 5B, 5C, 5D.

Figure 5A:
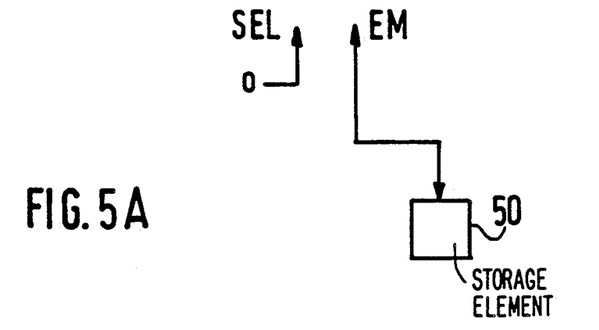
FIGS. 5A, 5B, 5C, 5D show different selection modes for different encoding configurations for the neuron states.

In FIG. 5A, the neuron state is encoded on 1 bit. The signal SEL is set to the state 0 and the programmable memory supplies the synaptic coefficients. The signal SELA is determined in order to impart to the signal EM the neuron state of the storage element 50 of the state memory. In this case the state of the neuron is encoded as 0 or 1.

Figure 5B:
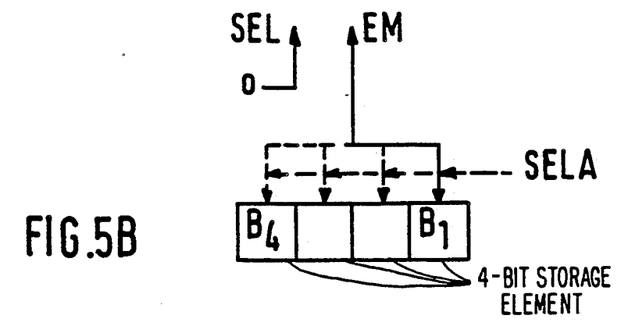

In FIG. 5B the neuron state is encoded on 4 non-signed bits. The signal SEL remains 0 and the signal EM is successively formed by all bits of the neuron state, starting with the least significant bit (B₁) and finishing with the most significant bit (B₄), under the control of the signal SELA.

For the examples shown in the FIGS. 5A and 5B, where the signal SEL is set to a given state, it follows that the selectors and the switches can be omitted for a structure which utilises only these encoding possibilities.

Figure 5C:
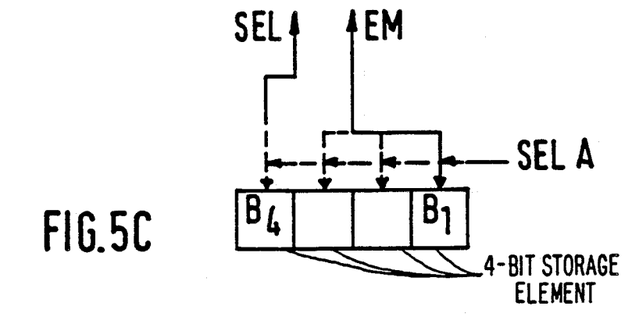

In FIG. 5C the neuron state is encoded in 2's-complement. The signal SEL is zero when the three least significant bits are selected and becomes equal to one when the most significant bit is selected and this bit is 1. The signal EM successively copies, as before, all other bits of the neuron state under the control of the signal SELA.

In that case each neuron state is encoded in 2's-complement and the state memory comprises N.n storage elements; a selector of a group A of N selectors successively selects the n bits (B$_n$, ... B₁), starting with the least significant bit B₁, in order to supply for each selection a signal EM which enters into the multiplier ET and which is associated with the neuron state, the group A of selectors being controlled by the control circuit by way of a signal SELA, each synaptic coefficient being read by means of one of the N switches controlled by a respective signal SEL, the values or the logic levels of the signals EM and SEL being determined so that the signal SEL copies the sign bit when the latter is selected and is zero when the other bits are selected, and so that the signal EM copies all bits when they are selected, the adder tree comprising, connected to its output, an adder and a shift accumulator so that the determination of the sum S is performed in n shift control cycles after the reading of the synaptic coefficients in the programmable memory.

Figure 5D:
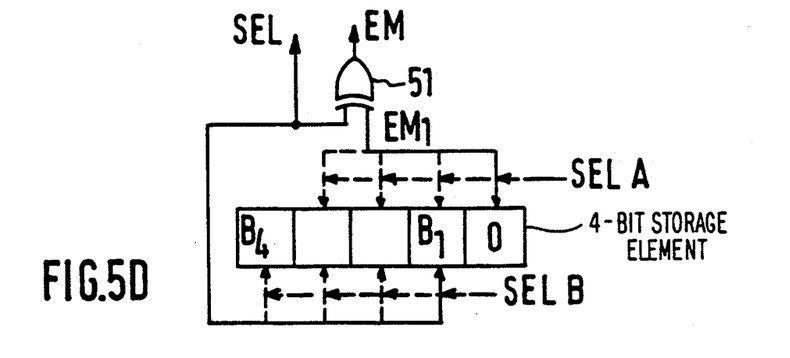

In FIG. 5D the neuron state is encoded on 4 bits in 2's-complement. In this case the signal SEL is successively formed by all state bits of the neuron. The signal EM is obtained by means of an exclusive-OR-gate 51 which receives on the one hand the signal SEL and on the other hand every n−1 bits of the neuron state (signal $EM_1$), the reading of the state memory via the signal SEL and via the signal $EM_1$ being shifted through one bit. The first data applied $EM_1$ is the logic state 0 whilst the data applied via SEL is the least significant bit ($B_1$) of the neuron state. Thus, a signed multiplication is performed in accordance with the Booth algorithm.

In this case each neuron state is encoded on n bits in 2's-complement, the most significant bit being the sign bit, the state memory comprising N.n storage elements, each switch associated with each neuron state being controlled by a signal SEL from a selector of a group B of selectors which successively selects the first until the $n^{th}$ bit of the corresponding neuron state, starting with the least significant bit, and at the same time each selector of a group A of selectors successively selects, shifted through one bit with respect to the group B, a logic value 0 until the $(n-1)^{th}$ bits of the neuron state, each output $EM_1$ of the selector of the group A and each output SEL of the selector of the group B being applied to an exclusive-OR logic gate which delivers the signal EM applied to the logic AND-gate multipliers, the selector groups A and B being controlled by the control circuit via the signals SELA, SELB, respectively, the adder tree comprising, connected to its output, an adder and a shift accumulator so that the determination of the sum S takes place in n shift control cycles after the reading of the synaptic coefficients in the programmable memory.

The following is the operating mode which is common to the different neuron state codes on n bits:
selection of a column of synaptic coefficients,
selection of all first bits of the neuron state registers,
formation of the sum of the products which is applied to an accumulator and shifting to the right of this sum.

SECOND PHASE selection of the same column of synaptic coefficients,
selection of all second bits of the neuron state registers,
formation of the sum of the products and accumulation with the value previously shifted,
shifting to the right of the result, once the addition has taken place.

The operation continues until the:

$n^{th}$ PHASE selection of the same column of synaptic coefficients,
selection of the $n^{th}$ bits of the neuron state memory,
formation of the sum of the products and accumulation with the preceding partial result,
application of the resultant sum to the converter table which provides the new neuron state corresponding to the column of synaptic coefficients.

$n+1^{th}$ PHASE selection of the address of the neuron concerned in the state memory and storage of the conversion result, i.e. n bits.

The total evaluation of the network is realised by repeating these $n+1^{th}$ cycles as many times as there are neurons in the network.

The neural network system in accordance with the invention enables easy modification of the programmable function. Moreover, because this system operates digitally specific programmable functions can be obtained.

Figure 6A:
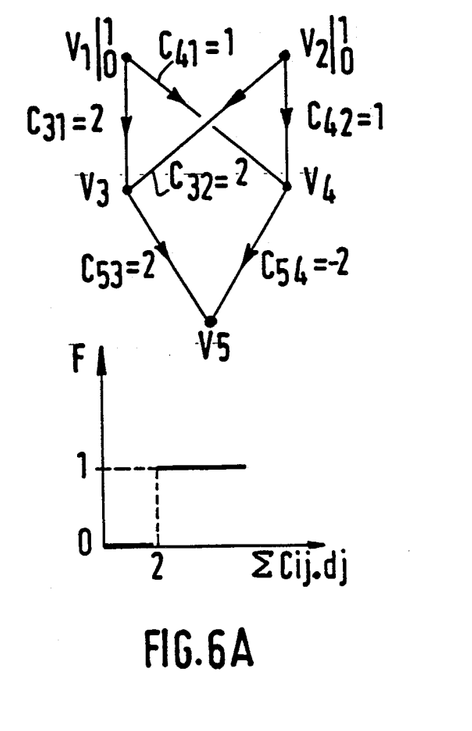
FIGS. 6A and 6B show an example of encoding in order to obtain a final neuron state corresponding to the exclusive-OR function of the input neuron states.
Figure 6B:
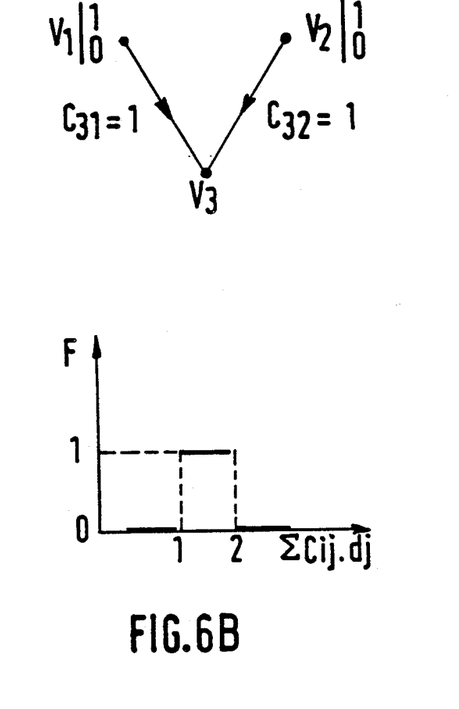

FIG. 6 shows a first example for realising the exclusive OR function by means of the neural network system in accordance with the invention. It requires only three neurons distributed in two neuron layers: a first layer (V1, V2) and a second layer (V3). The function applied is such that
F=0 if the sum of $C_{ij} \times d_j$ is lower than 1,
F=1 if the sum of $C_{ij} \times d_j$ is larger than or equal to 1 and smaller than 2.
F=0 if the sum of $C_{ij} \times d_j$ is larger than or equal to 2.

FIGS. 7A to 7G show a second example. In accordance with the invention, the output neuron state can be encoded in several fields in order to represent several data and to update the neuron state, and hence several data, in a single operation.

Figure 7A:
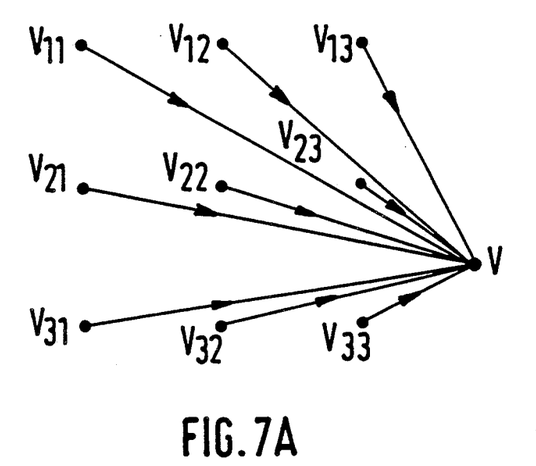
FIGS. 7A to 7G show an example of encoding neuron states for updating a variety of information in a single operation.

The example concerns nine input neurons V11 to V33 which are encoded as 0 or 1 and which are connected to a single output neuron V. The following synaptic coefficients are associated with the various connections:
from V11 to V: coefficient $C11=64=2^6$
from V12 to V: coefficient $C12=16=2^4$
from V13 to V: coefficient $C13=4=2^2$
from V21 to V: coefficient $C21=1$
from V22 to V: coefficient $C22=64+16+4+1=85$
from V23 to V: coefficient $C23=1$
from V31 to V: coefficient $C31=4=2^2$
from V32 to V: coefficient $C32=16=2^4$
from V33 to V: coefficient $C33=64=2^6$
This type of encoding corresponds to field-type encoding.

A function F is then applied to the result obtained for the state of the neuron V so that:
F=1 if the sum of $C_{ij} \times d_j = (2 \times 1) + 85$ (FIG. 7C)
F=2 if the sum of $C_{ij} \times d_j = (2 \times 4) + 85$ (FIG. 7D)
F=3 if the sum of $C_{ij} \times d_j = (2 \times 16) + 85$ (FIG. 7E)
F=4 if the sum of $C_{ij} \times d_j = (2 \times 64) + 85$ (FIG. 7F)
F=0 in the other cases.

Figure 7B:
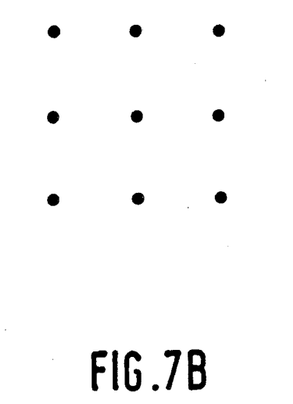
Figure 7C:
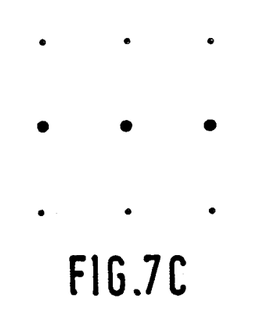
Figure 7D:
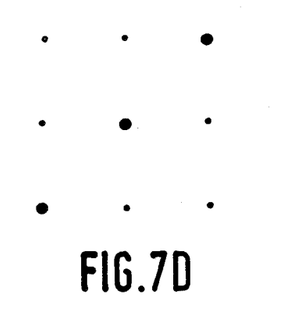
Figure 7E:
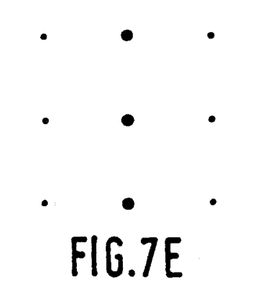
Figure 7F:
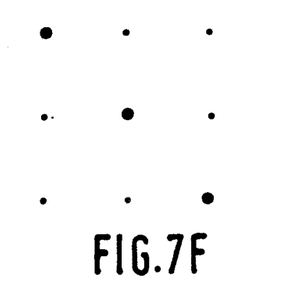
Figure 7G:
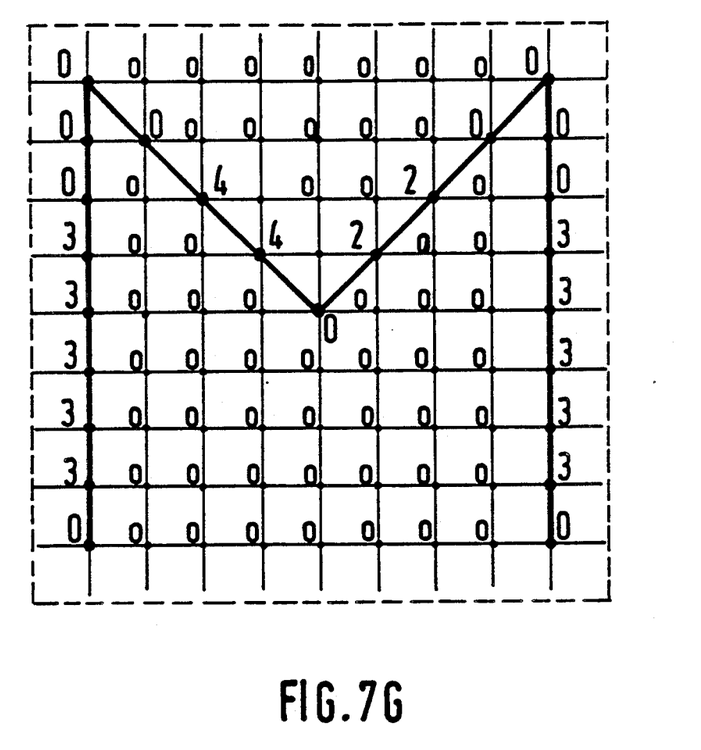

FIG. 7B shows an analysis window formed by the 9 neurons mentioned hereinbefore. If this window is applied to each point of the network represented in the FIG. 7G with the letter M, each point of the network can thus be characterized by the value of F.

The microprocessor 14 (FIG. 1) can then perform the recognition operation and the result can be displayed on the screen of the monitor 18.

The described neural network system can be realised on the basis of functional blocks especially adapted to the applications. Some of these functional blocks can be deemed to be standard and are not exclusively associated with a given application. Other functional blocks, however, specifically relate to the application, for example the converter element. Therefore, it is desirable to make the standard functional blocks suitable for operation with different converter elements. The neuron circuit in accordance with the invention can thus be conceived either with or without an integrated converter element.

Figure 8:
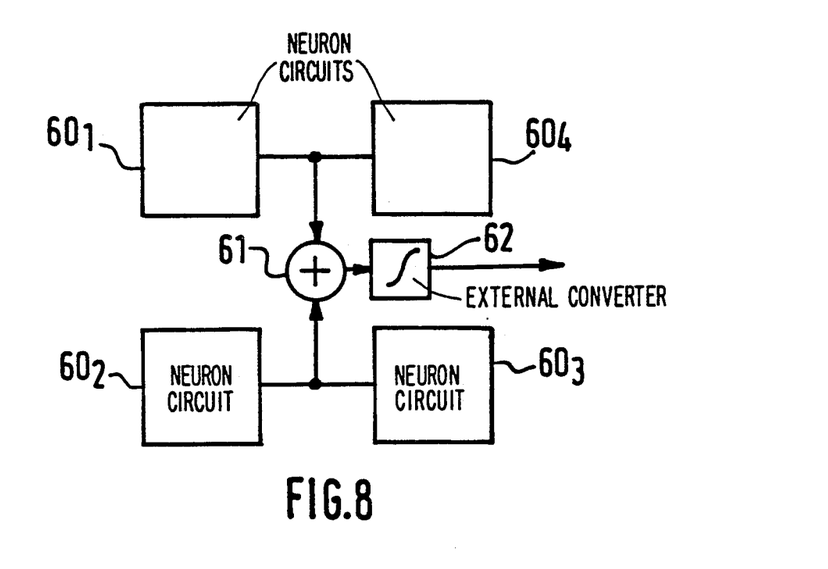
FIGS. 8, 9, 10 show different arrangements associating several neuron circuits.

A number of these circuits can be associated in order to form more complex neural network systems. FIG. 8 shows a system consisting of four circuits $60_1$, $60_2$, $60_3$, $60_4$, enabling the processing capacity of a single circuit to be increased by a factor of four by doubling on the one hand the number of neurons and by doubling on the other hand the number of synaptic coefficients, resulting in a fully connected network of 2N neurons. A single external adder 61 and a single external converter element 62 are then used.

Parallel connection of several circuits also enables an improvement of the accuracy of the synaptic coefficients. In this case the system comprises at least two parallel-connected circuits in order to operate on the synaptic coefficients encoded on an increased number of bits.

Figure 9:
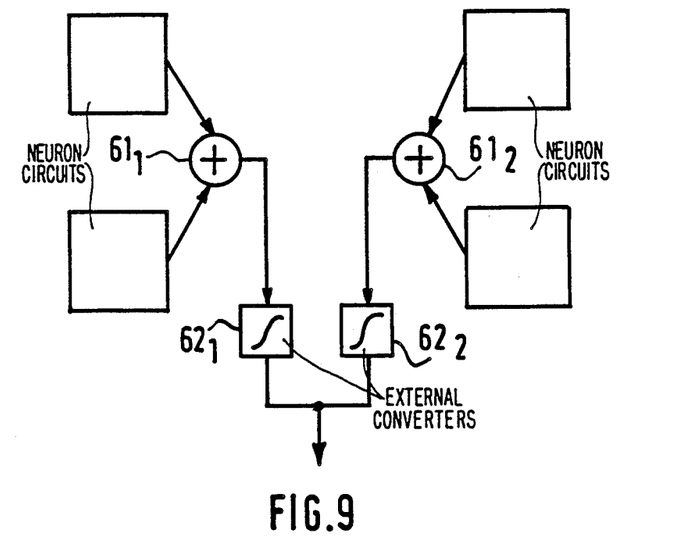

FIG. 9 shows a similar system, be it with an operating speed which is twice as high. It requires the use of two external adders $61_1$, $61_2$ and two converter elements $62_1$ and $62_2$.

Figure 10:
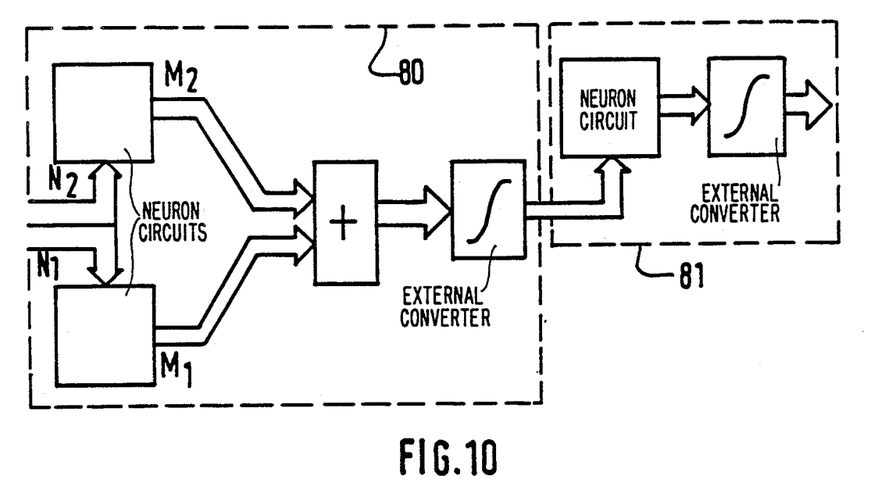

FIG. 10 shows a more complex system of neuron circuits in which a first group of neuron circuits 80 is connected as a layer to a second neuron circuit 81. It is also possible to construct complex neural network systems by utilising fully interconnected networks as well as networks connected in layers.

Figure 11:
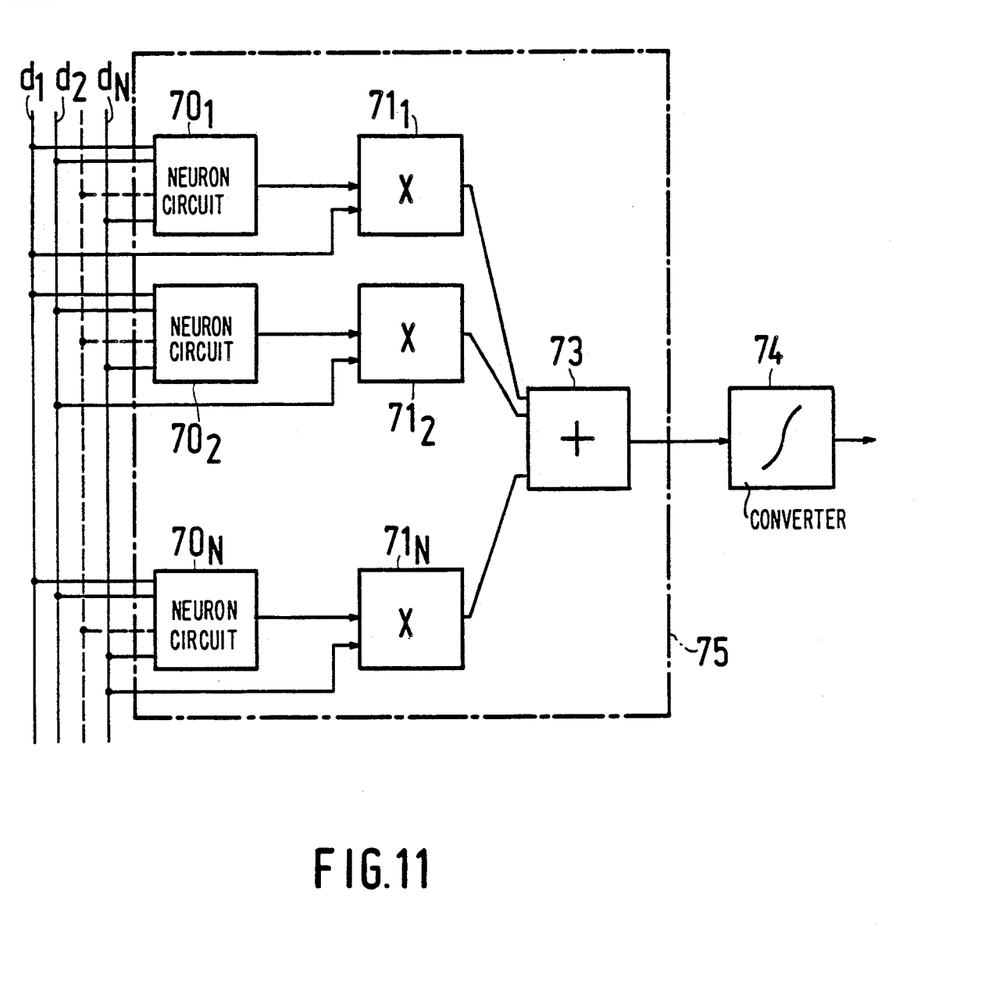
FIG. 11 shows a group of neural networks having an order higher than 2.

FIG. 11 shows a type of arrangement of neuron circuits for forming a neural network of the order q which is higher than 2. Note that the order of the systems and circuits previously described equals 2 (indices i and j). In the case of a higher order, for example q=3 (indices i, j, k), the new state $d_i(t+1)$ of a neuron i is determined by the states $d_j(t)$ of the neurons j and the states $d_k(t)$ of the neurons k at the instant t, so that:

$$d_i(t + 1) = F\left( \sum_{jk} C_{ijk} \times d_j(t) \times d_k(t) \right)$$

where
i relates to [1,M]
j relates to [1,N]
k relates to [1,N].

In the diagram shown in FIG. 11 such an arrangement 75 is realised by factorizing first on the N neurons having the index j and subsequently on the N neurons having the index k. This enables the processing capacity to be multiplied by N without modifying the number N of neurons of the basic circuit. In this case use is made of N previously described neuron circuits $70_1$, $70_2$, ..., $70_N$ with or without the converter element, the outputs of said N neuron circuits $70_1$ to $70_N$ being multiplied by the states $d_1$ to $d_N$, respectively, in the multipliers $71_1$ to $71_N$, whose outputs are connected to an adder tree 73. The result obtained is subjected to the action of the converter element 74 in order to deliver the new state of the neuron di(t+1) at the instant (t+1).

The arrangement 75 can itself constitute a basic element for a higher-order arrangement. To end use is made of N arrangements $75_1$ to $75_N$ which are similar to the arrangement 75 and which are interconnected in the same way as the circuits $70_1$ to $70_N$ in FIG. 11 in order to form an arrangement of a higher order neural network. Thus, the blocks $70_1$ to $70_N$ can be repeatedly replaced by the blocks $75_1$ to $75_N$ having the same structure as the block 75. As has been described hereinabove, as a result of the parallel architecture of the system high operating speeds are attainable. Furthermore, the modular architecture enables extension of the system in a clear way.

We claim:

1. A neuronal circuit for a neural network system which circuit enables digital determination of new states of M neurons by determining products of states of N input neurons and M input vectors of N synaptic coefficients which are associated with each interconnection between neurons and which are stored in a programmable memory,
characterized in that the neuronal circuit comprises an integrated circuit for performing for a given neuron chosen from the M neurons, parallel processing of all synaptic coefficients of the given neuron and which comprises:
(a) the programmable digital memory which is integrated in the circuit for storing the N×M synaptic coefficients of all M neurons encoded on p bits, and for simultaneously supplying all synaptic coefficients of the given neuron,
(b) N digital multipliers for determining the products of the N synaptic coefficients of the given neuron and the states of the N input neurons,
(c) an adder tree for determining the sum S of all said products for the given neuron, and
(d) a digital state memory for receiving the states of the N input neurons which may be encoded from 1 to n bits in a reconfigurable mode, the circuit being controlled by control means,
where N, M, p, and n represent positive integers and S represents a number.

2. A circuit as claimed in claim 1, characterized in that the N multipliers are formed by logic AND-gates.

3. A circuit as claimed in claim 2, characterized in that the state of a neuron is encoded on n=1 bit, the state memory comprising N storage elements, the determination of the sum S taking place during a single control cycle after the reading of the synaptic coefficients.

4. A circuit as claimed in claim 2, characterized in that the state of each neuron is encoded on n bits, the state memory comprising N×n storage elements, each neuron state (or each relevant synaptic coefficient) being read by means of an associated selector from a group A of selectors which successively selects the n bits of the neuron state (or said relevant synaptic coefficient) in order to supply a signal EM which is applied to a multiplier comprising logic AND-gates, the group A of selectors being controlled by the control means via a signal SELA, the adder tree comprising, connected to its output, an adder and a shift accumulator so that the sum S is determined in n (or p) shift control cycles after the start of the reading of the synaptic coefficients in the programmable memory.

5. A circuit as claimed in claim 4, characterized in that in operating with signed synaptic coefficients, the adder tree comprises adders for operating on the sign bits of the N products.

6. A circuit as claimed in claim 5, characterized in that the neuron states are encoded in 2's-complement, the adder tree comprising, connected to its output, an adder/subtractor and a shift accumulator, the "substract" operation being performed at the instant at which the sign bit of the neuron state is selected and if this sign bit represents a negative value.

7. A circuit as claimed in claim 5 characterized in that the neuron states are encoded as logic levels K=+1/−1, the circuit further comprising N switches, controlled by a selection signal (SEL), for enabling reading of the synaptic coefficients from the programmable memory as they are stored therein when K=+1 or in inverted logic levels when K=−1.

8. A circuit as claimed in claim 7, characterized in that each neuron state is encoded in 2's-complement, the state memory comprising N.n storage elements, a selector of a group A of N selectors successively selecting the n bits ($B_n \ldots B_1$), starting with the least significant bit $B_1$, in order to produce upon each selection a signal EM which is applied to the multiplier ET relating to the neuron state, the group A of selectors being controlled by the control means, using a signal SELA, each synaptic coefficient being read by means of one of the N switches controlled by a respective signal SEL, the values or the logic levels of the signals EM and SEL being determined so that the signal SEL copies the sign bit when it is selected and is zero when the other bits are selected, and so that the signal EM copies all bits when they are selected, the adder tree comprising, connected to its output, an adder and a shift accumulator so that the sum S is determined in n shift control cycles after the reading of the synaptic coefficients in the programmable memory.

9. A circuit as claimed in the claim 7, characterized in that each neuron state is encoded on n bits in 2's-complement, the most-significant bit being the sign bit, the state memory comprising N.n storage elements, each switch associated with each neuron state being controlled by a signal SEL supplied by a selector from a group B of selectors which successively select the first until the $n^{th}$ bit of the corresponding neuron state, starting with the least-significant bit, simultaneously each selector from a group A of selectors successively selecting, shifted through one bit with respect to the group B, a logic value 0 until the $(n-1)^{th}$ bits of the neuron states, each output $EM_1$ of the selector of the group A and each output SEL of the selector of the group B being applied to an exclusive-OR-gate which supplies the signal EM applied to the logic AND-gate multipliers, the group A and the group B of selectors being controlled by the control circuit, via the signals SELA, SELB, respectively, the adder tree comprising, connected to its output an adder and a shift accumulator so that the sum S is determined in n shift control cycles after the reading of the synaptic coefficients in the programmable memory.

10. A circuit as claimed in claim 2, characterized in that the neuron states are encoded as logic levels $K = +1/-1$, the circuit further comprising N switches, controlled by a selection signal (SEL), for enabling reading of the synaptic coefficients from the programmable memory as they are stored therein when $K = +1$ or in inverted logic levels when $K = -1$.

11. A circuit as claimed in any one of the claim 1, characterized in that it comprises two state memories so that one memory stores the input neuron states and the other memory stores the new neuron states, the latter states being the relevant states when the renewal of all input neuron states has been effected.

12. A circuit as claimed in any one of the claim 1, characterized in that the number of neurons N at the input and the number of neurons M at the output are equal, thus forming a fully connected neural network.

13. A neuronal device, comprising a neuronal circuit as claimed in claim 1 and comprising a digital converter element which subjects the sum S to a programmable function and which supplies results which enable updating of the state of the given neuron.

14. A device as claimed in claim 13, characterized in that the converter element is either a processor or a digital memory.

15. A neuronal arrangement comprising n devices as claimed in claim 13, each of which device is provided with a digital state memory which stores 1 bit of each state, the states being encoded on n bits, the devices being connected in parallel in order to increase a processing speed.

16. A neural network system comprising a device as claimed in claim 13, controlled by a central processor.

17. A circuit as claimed in any one of the claim 1, characterized in that it also comprises a digital converter element which subjects the sum S to a programmable function and which supplies results enabling the updating of the state of the given neuron.

18. A circuit as claimed in claim 17, characterized in that the converter element is a digital memory.

19. A neuronal arrangement comprising a device as claimed in claim 13, characterized in that it comprises $k = k_1 \times k_2$ devices capable of storing $k \times N \times M$ synaptic coefficients organised in $k_1 \times M$ neurons of $k_2 \times N$ synaptic coefficients.

20. An arrangement as claimed in claim 19, characterized in that it comprises at least two devices which are connected in parallel for operating on synaptic coefficients encoded on an increased number of bits.

21. A neuronal arrangement comprising a circuit as claimed in claim 17, characterized in that it comprises $k = k_1 \times k_2$ circuits for storing $k \times N \times M$ synaptic coefficients organised in $k_1 \times M$ neurons of $k_2 \times N$ synaptic coefficients.

22. An arrangement as claimed in claim 21, characterized in that it comprises at least two circuits which are connected in parallel in order to operate on synaptic coefficients encoded on an increased number of bits.

23. A neuronal arrangement comprising n circuits as claimed in claim 17, each of which circuit is provided with a digital state memory which stores 1 bit of each state, the states being encoded on n bits, the circuits being connected in parallel in order to increase a processing speed.

24. A third-order neural network system, comprising N circuits or devices or N second-order arrangements as claimed in claim 1, 17, 13, 21, or 23, first outputs of the N circuits or devices or arrangements ($70_1 \ldots 70_N$) being multiplied by the N states of the neurons in N multipliers ($71_1 \ldots 71_N$) whose second outputs are added in an adder tree (73), a converter element subjecting a third output of the converter element to a programmable function and supplying results enabling the updating of the state of each given neuron.

25. A neural network system of the order q which is higher than 3, wherein the second-order circuits or arrangements as claimed in claim 24 are replaced by systems of the order $q-1$.

26. A neural network system comprising a q order system as claimed in claim 25, controlled by a central processor.

27. A neural network system comprising a third order system as claimed in claim 24, controlled by a central processor.

28. A neural network system comprising a circuit as claimed in claim 17, controlled by a central processor.

29. A neural network system comprising an arrangement as claimed in claim 21, 22, 23, 19, 20, or 15, controlled by a central processor.

* * * * *